United States Patent [19]
Caray et al.

[11] 4,410,075
[45] Oct. 18, 1983

[54] TORSIONAL DAMPERS

[75] Inventors: André Caray, Paris; Dominique Després, Clichy, both of France

[73] Assignee: Valeo SA, Paris, France

[21] Appl. No.: 311,189

[22] Filed: Oct. 14, 1981

[30] Foreign Application Priority Data

Oct. 15, 1980 [FR] France ................. 80 22002

[51] Int. Cl.³ ............................... F16D 3/66
[52] U.S. Cl. .................... 192/106.2; 464/68; 192/106.1
[58] Field of Search ............ 192/106.1, 106.2; 464/66, 67, 68, 85

[56] References Cited

U.S. PATENT DOCUMENTS

| | | | |
|---|---|---|---|
| 2,028,951 | 1/1936 | Reed. | |
| 2,029,339 | 1/1932 | Reed | 192/106.2 |
| 4,220,233 | 9/1980 | Ban et al. | 192/106.2 |
| 4,304,107 | 12/1981 | Fall et al. | 192/106.1 |
| 4,347,717 | 9/1982 | La Marche | 192/106.2 |

FOREIGN PATENT DOCUMENTS

| | | |
|---|---|---|
| 1411155 | 4/1965 | France. |
| 88012 | 5/1965 | France. |
| 2279973 | 2/1976 | France. |
| 2387384 | 11/1978 | France. |
| 2393199 | 12/1978 | France. |

*Primary Examiner*—Rodney H. Bonck
*Assistant Examiner*—David D. House
*Attorney, Agent, or Firm*—Charles E. Brown

[57] ABSTRACT

A torsional damper comprising two coaxial parts with respective disks mounted for relative rotation, at least one guide ring and springs interposed circumferentially between the coaxial parts. The springs are divided into groups of at least two springs, with each spring individually housed in windows in the disks and guide rings. The springs are all engaged without circumferential play in the windows in the guide rings and each is engaged with circumferential play in the corresponding window in the disk of at least one of the coaxial parts.

11 Claims, 19 Drawing Figures

TORSIONAL DAMPERS

BACKGROUND OF THE INVENTION

1. Field of the Invention

The present invention concerns a torsional damper comprising at least two coaxial parts mounted to rotate relative to one another within a defined sector of relative angular movement, and circumferentially acting elastic means disposed circumferentially between said parts.

2. Description of the Prior Art

This type of torsional damper is normally incorporated in the design of a friction clutch, particularly for automotive vehicles, in which case one coaxial part carries a friction disk designed to engage rotationally with a first shaft, in practice a driving shaft and the motor output shaft in the case of an automotive vehicle, whereas the other coaxial part is carried on a hub designed to engage rotationally with a second shaft, in practice a driven shaft and the gearbox input shaft in the case of an automotive vehicle.

This type of device is used to permit regulated transmission of rotational torque applied to one of its coaxial parts where the other is itself subject to a rotational torque. It is thereby able to filter vibrations which may arise at any point in the kinematic system in which it is incorporated, extending from the motor to the driven road wheels in the case of an automotive vehicle.

In some applications at least there is a two-fold requirement to be allowed for in the design of torsional dampers. The first requirement is to transmit a moderate torque throughout a greater or lesser degree of relative angular movement. This normally involves the use of elastic means of moderate stiffness. The second requirement is to further provide for the transmission of a high final torque at the final value of such relative angular movement, normally involving the use of elastic means of high stiffness.

The circumferentially acting elastic means normally employed comprise a plurality of elastic members, in practice springs, each of which extends in a substantially tangential direction relative to a circumference of the damper assembly. Each spring is housed in an opening formed in part by windows in a component of one of the coaxial parts of the torsional damper and in part by windows in a component of the other of said coaxial parts.

In the case of a first coaxial part (that carried by the hub, for example), the component in question comprises at least one disk with a transversely disposed coaxial part. In the case of the other coaxial part (that carrying a friction disk, for example), the aforementioned component comprises at least one annular ring with a transversely disposed coaxial part, parallel to the disk of the other coaxial part.

In practice and for equal mechanical loads on the springs, the spring length must be increased to obtain a wider range of relative angular movement for a given value of final torque or a higher value of final torque for a given range of relative angular movement.

The higher the range of relative angular movement and/or the final torque the higher the ratio between the circumferential extent of the windows in the disk and the guide rings necessary to house the springs and the circumferential extent of the material between the aforementioned windows.

The disk and the guide rings are weakened by the incorporation of the respective windows, with the result that there is a mandatory upper limit on the maximum torque which the disk and guide rings can transmit and/or the permitted range of relative angular movement.

Hence the requirement for the transmission of a moderate torque for a greater or lesser degree of relative angular movement and for the transmission of maximum final torque for the final value of relative angular movement is difficult to satisfy.

In practice, and in the case of an automobile, for example, the final value of relative angular movement is relatively high (around 15°, for example) and the final torque is relatively low (around 15 mkg, for example), or the final torque is high (around 25 mkg, for example) in which case the final value of relative angular movement is relatively low (around 8°, for example). These cases represent the two extremes between which all intermediate solutions are possible.

Various solutions to the problem of reconciling these conflicting requirements have been put forward.

One proposal is to use double torsional dampers, consisting of two torsional dampers in series and disposed axially relative to one another, a first operating at low values of torque and the second operating at higher values of torque, following saturation of the first.

Such double torsional damper devices have the disadvantage that their axial dimension is considerable, unacceptable in at least some applications.

Another proposal is for torsional dampers in which, in order to facilitate the incorporation of circumferentially acting elastic means, such means are fitted at various circumferences (that is, at different radii) in the damper assembly, certain of the elastic members thus being offset radially relative to the others.

However, this radial disposition of the various circumferentially acting elastic members also raises problems, in particular with regard to the axial spacers which normally connect the annular rings which are a feature of the construction of one of the coaxial parts concerned.

The object of the invention is to provide a torsional damper in which it is possible to reconcile the need for transmission of a moderate torque over a greater or lesser degree of relative angular movement and a maximum final torque, even where the springs are disposed on the same circumference of the damper assembly.

SUMMARY OF THE INVENTION

The invention consists of a torsional damper comprising at least first and second coaxial parts mounted to rotate relative to one another within a defined sector of relative angular movement, circumferentially disposed between said parts circumferentially acting elastic means comprising a plurality of elastic members some at least of which are associated with one another in series in a rest configuration of the damper assembly, and modulation means which, beyond a predefined degree of relative angular movement between said parts, bring about the parallel association with one another of at least some of said elastic members.

Each of said first and second coaxial parts may comprise a respective transversely disposed annular disk, the arrangement of said parts being such that said disks are parallel, and the damper may further comprise at least one transversely disposed annular guide ring parallel to said disks of said parts and free to rotate relative thereto, the elastic members of said circumferentially acting elastic means being each disposed in a housing formed partly by windows in said disks of the respective coaxial parts and partly by windows in said guide ring, said elastic members being associated in groups of at least two engaged with no circumferential play, in the rest configuration of the damper, in the corresponding windows of the guide ring, said modulation means consisting in the engagement of each elastic member in each group of elastic members, in the rest configuration of the damper, with circumferential play in the corresponding window of the disk of at least one of said coaxial parts.

In accordance with a preferred embodiment of the invention each group of elastic members comprises two elastic members, one of which engages without circumferential play in the corresponding window in the disk of a first of said coaxial parts and with circumferential play in the corresponding window in the disk of the second of said coaxial parts, and the other of which conjointly engages with circumferential play in the corresponding window in the disk of said first coaxial part and without circumferential play in the corresponding window in the disk of said second coaxial part.

The circumferentially acting elastic members operate in two different manners, according to the degree of relative angular movement between the two coaxial parts constituting the torsional damper: for first values of this relative angular movement the two elastic members in each group of circumferentially acting elastic members are associated with one another serially, whereas for the final value of the aforementioned relative movement they are associated with one another in parallel.

As is well known, when two elastic members cooperate in series it is their degrees of compression, and thus the corresponding relative angular movements, which add, whereas it is their respective values of stiffness which add when cooperating in parallel.

Thus in the torsional damper in accordance with the invention, the overall stiffness of each group of circumferentially acting elastic members is relatively low for the aforementioned first values of relative angular movement and relatively high for the final value of relative angular movement, the same elastic members being operative in both cases.

Thus it is possible to obtain a relatively high degree of relative angular movement at moderate torques with a relatively high value of final torque for the final value of relative angular movement, with the springs located on a common circumference of the damper assembly, if required.

Alternatively, and still in accordance with the invention, it is possible to have a higher initial stiffness for a defined degree of relative angular movement, so improving the filtering action in respect of noise and vibration for moderate torques.

Further description of the prior art

It is known, in particular from the disclosure of French Patent Application No. 78 16117 (published under No. 2 393 199), to incorporate in a torsional damper circumferentially acting elastic members in a number of groups, the groups cooperating in parallel with one another while within each group the elastic members constituting the group cooperate in series.

This arrangement, which differs from that which is the subject of the present invention since its operation is not conditioned by the relative angular movement between the coaxial parts of the torsional damper, has a number of disadvantages.

Firstly, it cannot be implemented using elastic members which are all identical.

Secondly, it leads to more or less rapid saturation of the low-stiffness elastic members used, as in conventional torsional dampers. Once saturated, these members are no longer operative and thus are not used to the best effect throughout the relative angular movement between the two coaxial parts constituting the torsional damper.

Finally, the final torque achieved for the final value of relative angular movement between the two parts remains low.

In the arrangement in accordance with the invention, the circumferentially acting elastic members may, if required, all be identical. In particular, they may all have the same stiffness. Also, they may all be operative throughout relative angular movement between the two corresponding coaxial parts, if required.

Also, and as previously indicated, the final torque achieved for the final value of relative angular movement between said coaxial parts may, if required, be high, even when the degree of relative angular movement at moderate torques is itself high.

For example, applying the invention to a high-quality automobile it would be possible to obtain a final torque of 35 to 36 mkg for a final relative angular movement of 15°, the relative angular movement at low and moderate torques extending over 10° to 12°, for example.

It has also been proposed, in known torsional dampers, to provide each of the coaxial parts constituting the torsional damper with a transversely disposed annular disk, the arrangement being such that the disks are parallel to one another. The disk of one of said coaxial parts is carried by a hub while the disk of the other carries a friction disk in the case of a friction clutch with a damper hub. Associated with said coaxial parts is at least one transversely disposed annular guide ring parallel to the disks of said coaxial parts and free to rotate relative thereto. The circumferentially acting elastic members are interposed between said coaxial parts, with each individual member disposed in a housing formed in part by a window in each of said coaxial parts and in part by a window in a guide ring.

This arrangement is disclosed, in Patent of Addition No. 88 012 to French Patent No. 1 411 155 and in French Patent Application No. 75 23273 (published under No. 2 279 973).

In Patent of Addition No. 88 012 to French Patent No. 1 411 155, for example, the circumferentially acting elastic members are associated to form groups of at least two elastic members which, in the rest configuration of the damper, are all engaged without circumferential play in the corresponding windows in the two guide rings of the torsional damper. One of the two elastic members in each of these groups is simultaneously engaged, in this rest configuration, without play in the corresponding windows of the two coaxial parts constituting the torsional damper, the other elastic member in the group being engaged without circumferential play in the corresponding window in the disk of one of said coaxial parts and with circumferential play in the corresponding window in the disk of the other of the coaxial parts.

However, this arrangement is simply to ensure variable "hysteresis" effects for differing degrees of relative angular movement so as to modulate, according to the degree of relative angular movement, the difference (for the same relative angular movement) between the value of the torque for increasing relative angular movement and the value of the torque for decreasing relative angular movement. This arrangement does not lead to the initially series and then parallel association of any of the elastic members used.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
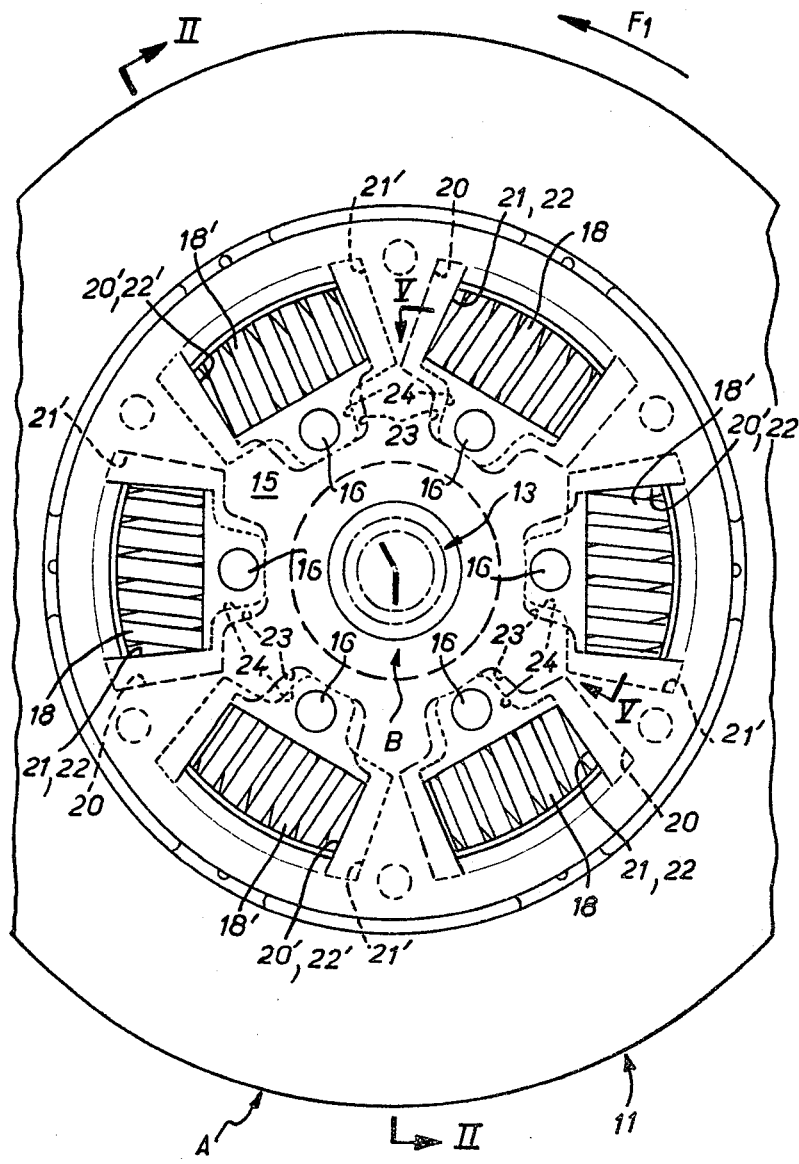
FIG. 1 is a partial view in elevation, as seen on the arrow I in FIG. 2, of a torsional damper in accordance with the invention.

The Figures show the application of the invention to the construction of a friction clutch suitable, for example, for equipping an automotive vehicle.

Overall, the torsional damper constituted by such a friction clutch comprises two coaxial parts A and B mounted to rotate relative to one another within defined limits of relative angular movement, and circumferentially acting elastic means, to be described in detail hereinafter, disposed circumferentially between said parts A and B.

In the embodiment shown in FIGS. 1 to 8, part A comprises a transversely disposed annular disk 10 carrying around its external periphery a friction disk 11 designed for positive rotational engagement with a first shaft, in practice a driving shaft and the motor output shaft in the case of an automotive vehicle (not shown).

Part B comprises transversely disposed annular disks 12, parallel to, one on each side of and spaced from disk 10 of part A, projecting radially from a hub 13 designed for positive rotational engagement with a second shaft, in practice a driven shaft and the gearbox input shaft in the case of an automotive vehicle (not shown).

In the embodiment shown the disks 12 are crimped onto the hub 13 using a technique known per se, although any other method may be used to attach the disks 12 to the hub 13 in such a way as to prevent their relative rotation (riveting, for example).

The torsional damper in accordance with the invention further comprises at least one transversely disposed annular guide ring parallel to disks 10 and 12 of parts A and B, respectively, and capable of angular movement relative thereto.

In the embodiment shown in FIGS. 1 to 8 there are two guide rings 15, on opposite sides of disks 12 and spaced therefrom.

The guide rings 15 are free to rotate on hub 13 and connected together in the axial direction by spacers 16.

There are six spacers 16 in the embodiment shown. They pass with play through disks 10 and 12 of parts A and B, as will be described in more detail hereinafter.

Circumferentially acting elastic means are interposed between the aforementioned parts and comprise a plurality of elastic members. In practice, these elastic members are springs, each of which extends in a substantially tangential direction relative to the circumference of the damper assembly.

In the embodiment shown in FIGS. 1 to 8 there are six springs in total, situated on the same circumference and constituting groups of two springs 18, 18'.

Figure 5:
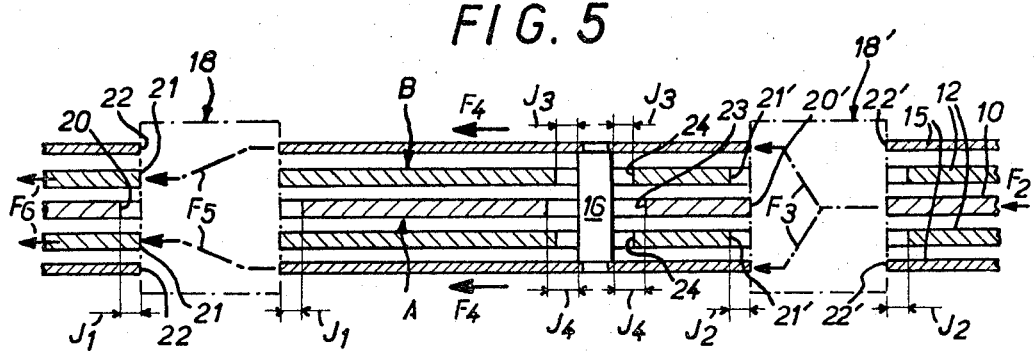
FIG. 5 is a partial circumferential cross-section, shown developed onto a flat plane, on line V—V in FIG. 1.

Thus in the embodiment shown there are three such groups, only one of these being visible in FIG. 5.

Figure 6:
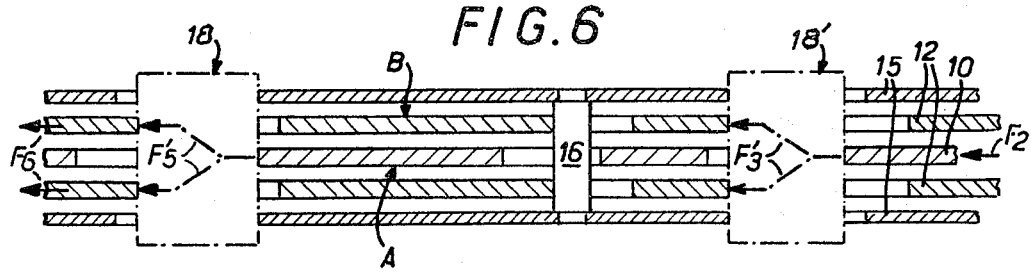
FIGS. 6 and 7 are views analagous to that of FIG. 5, relating to two consecutive phases in the operation of the torsional damper in accordance with the invention.
Figure 7:
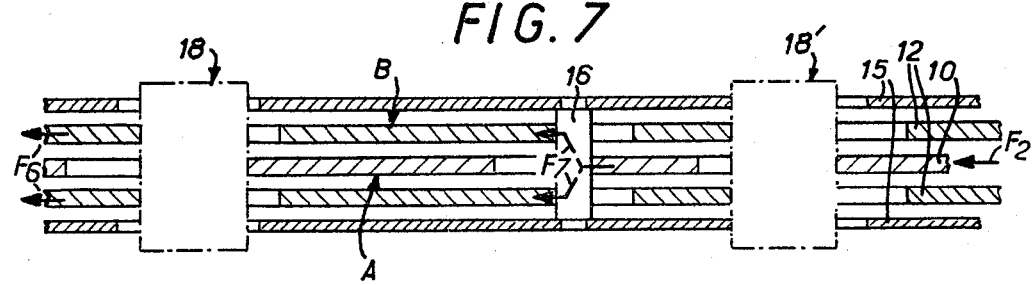

With a view to simplifying FIGS. 5 to 7, only this same single group of springs 18, 18' has been shown in these Figures.

The various springs 18, 18' are circumferentially disposed at regular intervals with springs 18 alternating with springs 18', as shown in FIG. 1.

Each of springs 18, 18' is disposed in a respective housing formed in part by windows 20, 20' in disk 10 of part A and in part by windows 21, 21' in disks 12 of part B and in part by windows 22, 22' in guide rings 15.

In the rest configuration of the damper, as shown in FIGS. 1 to 5, springs 18, 18' in each group are all engaged without circumferential play in the corresponding windows 22, 22' of guide rings 15. In other words, in this rest configuration the ends of springs 18, 18' bear on the corresponding edges of the windows 22, 22' in guide rings 15.

Thus in the rest configuration the damper springs 18, 18' are associated with one another in series, as we will describe in further detail hereinafter.

In accordance with the invention, the damper comprises modulation means which, beyond a predefined degree of relative angular movement between parts A and B, bring about the parallel association with one another of at least some of springs 18, 18', and in practice all of them, as will be further explained hereinafter.

In accordance with the invention and as shown in the embodiments described, these modulation means consist in the engagement of each spring 18, 18' in each group, in the rest configuration of the damper, with circumferential play in the corresponding window of the disk of at least one of said parts A and B.

In practice, in the embodiments shown in FIGS. 1 to 8, windows 21 in disks 12 of part B in which each spring 18 is engaged have a circumferential extent which is equal to that of windows 22 in guide rings 15 so that, in the rest configuration of the damper, a spring 18 is engaged without circumferential play in a window 21. In other words, each of its ends bears on the corresponding edge of one of these windows. Windows 20 in disk 10 of part A, in which each spring 18 is engaged, have a circumferential extent exceeding that of a window 21 so that, in the rest configuration of the damper, a spring 18 is engaged with circumferential play in a window 20.

In the embodiment shown, this circumferential play is distributed equally, in the rest configuration of the damper, to either side of each spring 18. As measured angularly, this play has the value J1 (see FIGS. 3 and 5).

Thus in the rest configuration of the damper each end of each spring 18 is spaced from the corresponding edge of a window 20 in disk 10 of part A.

Conjointly, windows 20' in disk 10 of part A, in which each spring 18' engages, have a circumferential extent which is equal to that of windows 22' in guide rings 15 so that, in the rest configuration of the damper, each end of each spring 18' is in contact with the corresponding edge of a window 20'.

On the other hand, the circumferential extent of windows 21' in disks 12 of part B, in which each spring 18' engages, is greater than that in guide rings 15 so that, in the rest configuration of the damper, each spring 18' engages with circumferential play in a window 21'.

In the embodiment shown, this circumferential play is distributed equally to either side of each spring 18'. As measured angularly, this play has the value J2 (see FIGS. 3 and 5).

In practice and in the embodiment shown, windows 22 and 22' in guide rings 15 have the same circumferential extent and the two values of circumferential play J1, J2 are the same.

In other words, in this embodiment the circumferential extent of windows 20 in disk 10 is equal to that of windows 21' in disks 12. Conjointly, the circumferential extent of windows 20' in disk 10 (the same as that of windows 22, 22' in guide rings 15) is the same as that of windows 21 in disks 12.

Thus disk 10 and disks 12 have windows of relatively greater circumferential extent alternating with windows of relatively lesser circumferential extent. As can be seen particularly clearly in FIGS. 3 and 4, the windows of relatively greater circumferential extent in one disk are axially aligned with those of relatively lesser circumferential extent in the other disk, and vice versa.

In practice, in the embodiment shown the circumferential length of the inner (smaller radius) edge of windows 20, 21 and 20', 21' in disks 10 and 12 are extended in the radial direction towards the axis of the damper, with a notch (23 in disk 10, 24 in disks 12) through which pass spacers 16.

Figure 3:
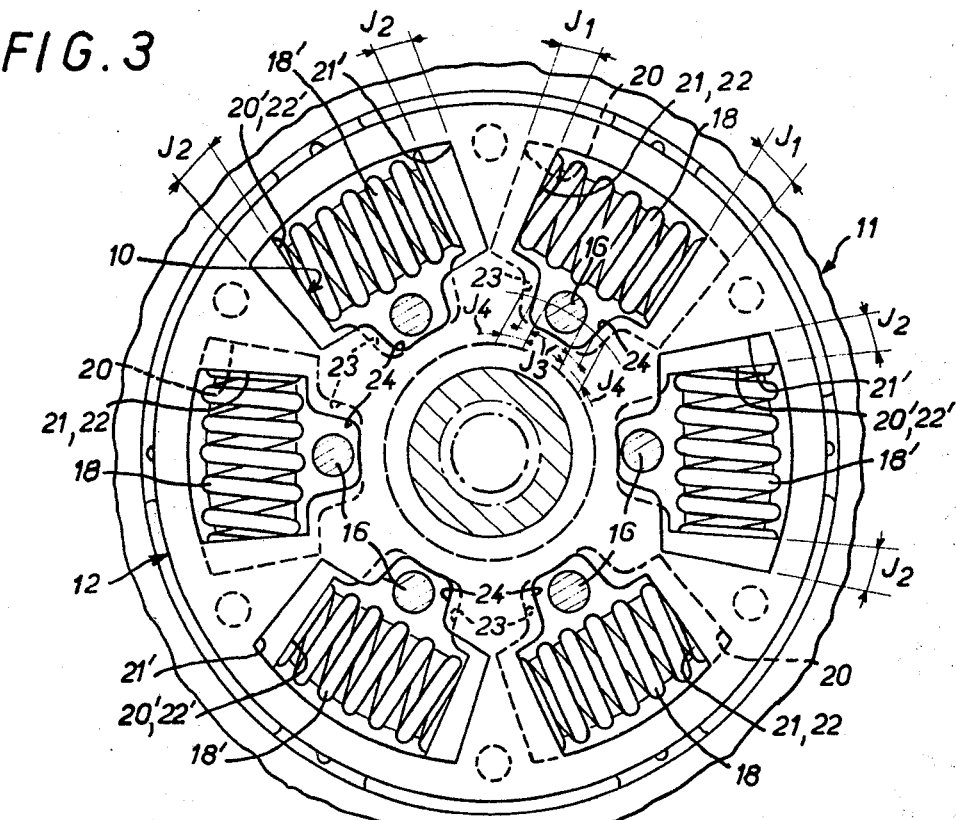
FIGS. 3 and 4 are partial transverse cross-sections on lines III—III and IV—IV, respectively, in FIG. 2.
Figure 4:
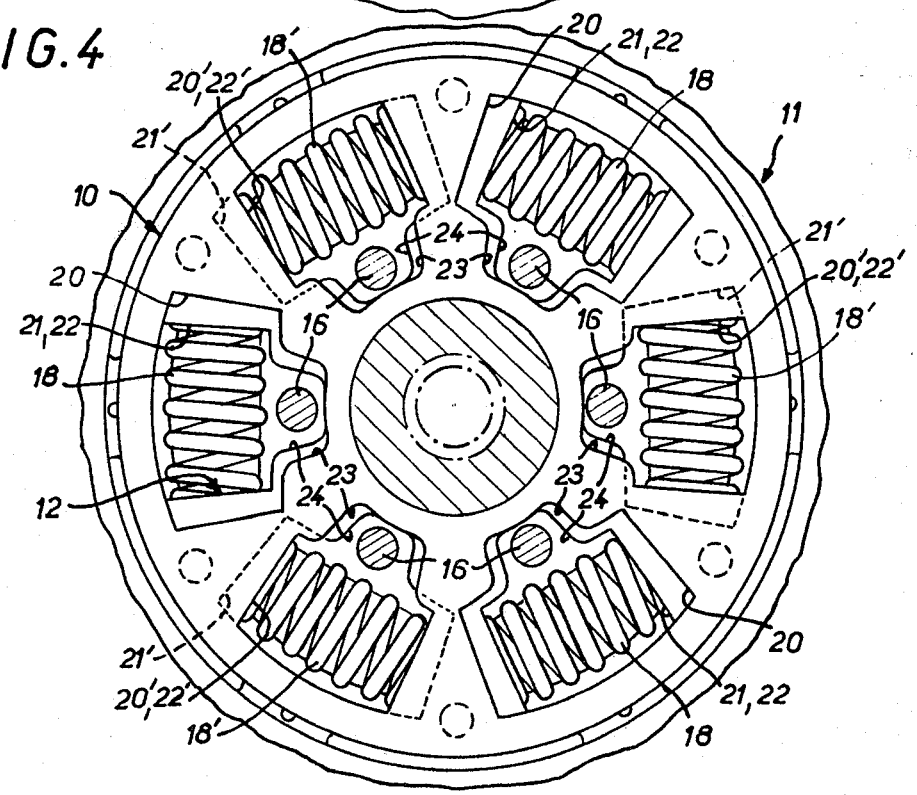

Whether extending windows 21 or windows 21', notches 24 in disks 12 are all of the same circumferential extent which is sufficient for there to be a circumferential play J3 on either side of each spacer 16 in the rest configuration of the damper. As measured angularly, the value of circumferential play J3 is at least equal to that of the aforementioned circumferential plays J1, J2 (FIGS. 3 and 5).

Conjointly, whether radially extending windows 20 or windows 20', notches 23 in disk 10 are all of the same circumferential extent which is sufficient for there to be a circumferential play J4 on either side of each spacer 16 in the rest configuration of the damper. As measured angularly, this circumferential play J4 is greater than the aforementioned circumferential play J3 (FIGS. 3 and 5).

The torsional damper further comprises conventional (and therefore not shown in the Figures) friction means designed to introduce a required degree of "hysteresis" into the operation of the damper, or in other words to differentiate for the same value of relative angular movement between parts A and B, between the value of the torque transmitted between the aforementioned parts for increasing values of torque and the value of the torque transmitted for decreasing values of torque.

Figure 2:
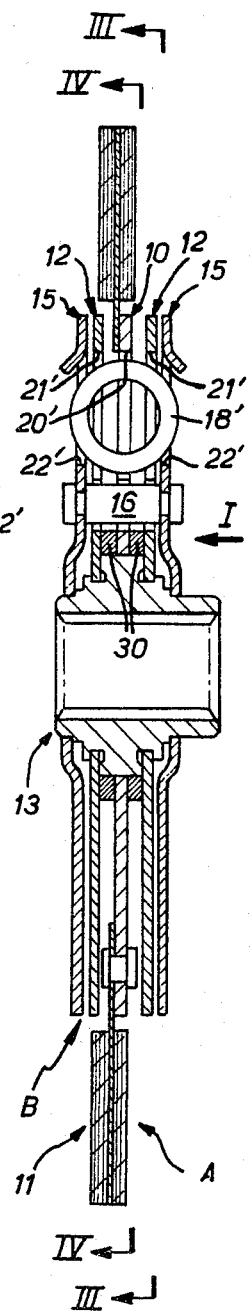
FIG. 2 is an axial cross-section on line II—II in FIG. 1.

In the conventional manner, such friction means may, for example, comprise friction rings interposed axially between components of parts A and B, such as the spacing rings 30 shown between disk 10 and disks 12 in FIG. 2.

It will be appreciated that the invention is not limited to the inclusion of these spacer rings 30 acting as friction rings, and that any friction means currently known per se for use in torsional dampers of this type may be employed instead.

As these friction means do not constitute part of the present invention, they will not be described further or subsequently referred to.

It will initially be assumed that springs 18 and 18' have the same stiffness.

This common stiffness is represented K.

It will then be assumed that with the torsional damper in accordance with the invention in use in traction, with part A of the damper tending to drive part B, the direction of rotation of the damper is as shown by arrow F1 in FIG. 1.

Referring to FIGS. 6 and 7, it will be further assumed that for such traction operation disks 12 of part B, attached to hub 13, are fixed, disk 10 of part A moving as shown by arrow F2 in FIGS. 5 to 7, corresponding to the direction of rotation F1 of the damper as shown in FIG. 1.

During a first phase, corresponding to a first range of relative movement between parts A and B of the damper, disk 10 of part A acts only on springs 18'. As shown by double dashed arrow F3 in FIG. 5, these springs are compressed to transfer to guide rings 15 the force applied to them by ring 10.

Guide rings 15 thus move relative to disk 10, in the direction shown by arrows F4 in FIG. 5.

By virtue of their movement, guide rings 15 compress springs 18 which bear on disks 12.

In practice, as springs 18, 18' are of the same stiffness they are simultaneously compressed to the same extent.

As they are compressed springs 18 transmit to disks 12 the force exerted on them by guide rings 15, as shown by the dashed arrows F5 in FIG. 5.

As a result, and in response to movement of disk 10 as shown by arrow F2, disks 12 tend to move conjointly in the same direction as disk 10, as shown by arrows F6 in FIG. 5.

Thus in this first phase of operation, in which a rotational torque is transmitted between disk 10 and disks 12 by virtue of springs 18 and 18', springs 18, 18' are associated with one another in series, with the torque transmitted by springs 18' passed on in full by springs 18.

For such serial cooperation, the overall stiffness for each group of springs 18, 18' is K/2.

Figure 8:
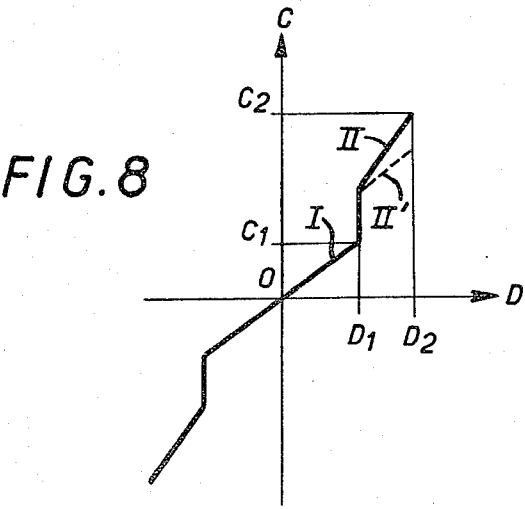
FIG. 8 is a diagram illustrating the operation of the torsional damper in accordance with the invention.
Figure 9:
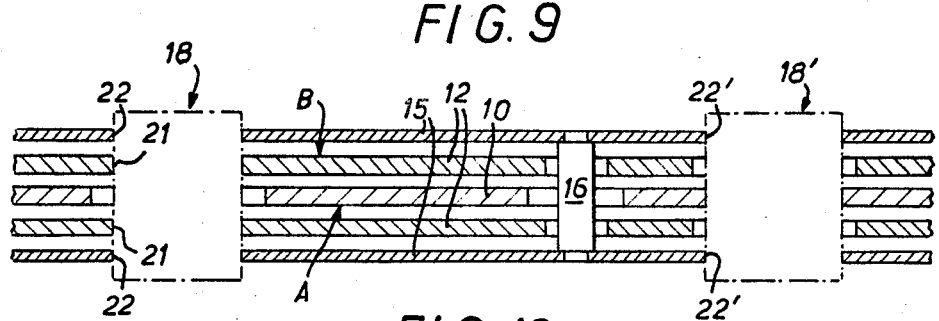
FIG. 9 is a view analagous to that of FIG. 5, for an alternative embodiment of the invention.
Figure 10:
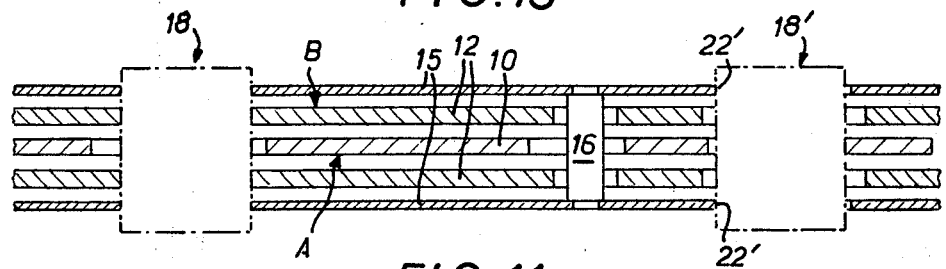
FIGS. 10, 11 and 12 are views analagous to that of FIG. 9 and relating to consecutive phases in the operation of the alternative embodiment.
Figure 11:
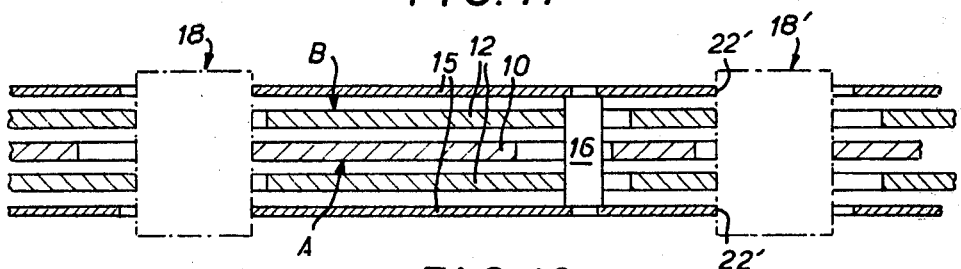

FIG. 8 is a diagram plotting the relative angular movement D between parts A and B of the damper (along the abscissae) as a function of the torque C transmitted between parts A and B (along the ordinates). This first phase of operation of the damper is represented by a straight line I passing through the origin O and with a slope proportional to K/2.

This first phase of operation continues until, at value D1 of the relative angular movement D, clearance J1 in the relevant direction of movement of disk 10 is absorbed so that disk 10 consequently also acts on springs 18 (FIG. 6).

Conjointly, and since in the embodiment shown play J2 is equal to play J1, springs 18' are urged by disk 10 to act directly on disks 12, as shown by the double dashed arrow F'3 in FIG. 6.

Similarly and at the same time, springs 18 are urged by disk 10 to act directly on disks 12, as shown by the double dashed arrow F'5 in FIG. 6.

Thus in transmitting torque from disk 10 to disks 12 springs 18, 18' are decoupled and cooperate in parallel, each spring transmitting directly to disks 12 the force applied to it directly by disk 10.

In this parallel operative association the overall stiffness for each group of springs 18, 18' is 2K.

Subsequently, in the second phase of operation, the curve (FIG. 8) shows an increase in torque at constant relative angular movement, due to the change in stiffness, and then continues with a straight line II, the slope of which is proportional to 2K and is thus four times that for the previous straight line section I.

This second phase of operation continues to the maximum value D2 of relative angular movement possible between parts A and B of the damper, in which part B is driven directly by part A. In the embodiment shown, and as indicated by the double dashed arrow F7 in FIG. 7, the spacers 16 are acted on directly by disk 10 and act directly on disks 12. An alternative method known per se to achieve this direct drive action is via the springs 18, 18' when fully compressed with adjacent turns contiguous.

With the arrangement in accordance with the invention it is possible to have a large relative angular movement at low and moderate torque (that is to say, in the phase of operation corresponding to series cooperation of springs 18, 18'), with a high value of torque for the final value of relative angular movement.

For example, for a final torque C2 of around 35 to 36 mkg the final value of relative angular movement may be around 15°, with a relative angular movement D1 at low and moderate torques of around 10° to 12°.

In the embodiment shown in FIGS. 9 to 13 the arrangement of parts is the same as previously described herein except that, in each group of springs 18, 18', spring 18 is pre-stressed in the rest configuration of the damper.

In other words, in this embodiment, in which springs 18, 18' are identical, as previously, the circumferential extent of windows 22 in guide rings 15, in which each spring 18 engages, is less than that of windows 22' in guide rings 15, in which each spring 18' engages.

The same applies to windows 21 in disks 12, which, as previously, have the same circumferential extent as windows 22 in guide rings 15.

The operation of this embodiment is identical to that previously described except that, for an initial phase beginning from the start of relative angular movement between parts A and B, only spring 18' in each group of springs 18, 18' is compressed. This preliminary phase continues until spring 18' is compressed to the same degree as spring 18 is compressed from the outset by virtue of its being pre-stressed.

Figure 13:
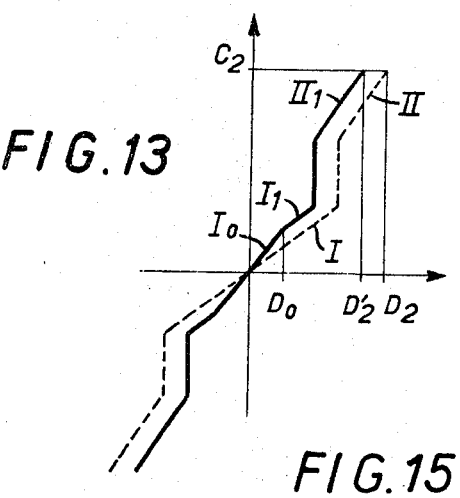
FIG. 13 is a diagram illustrating the operation of the alternative embodiment.
Figure 14:
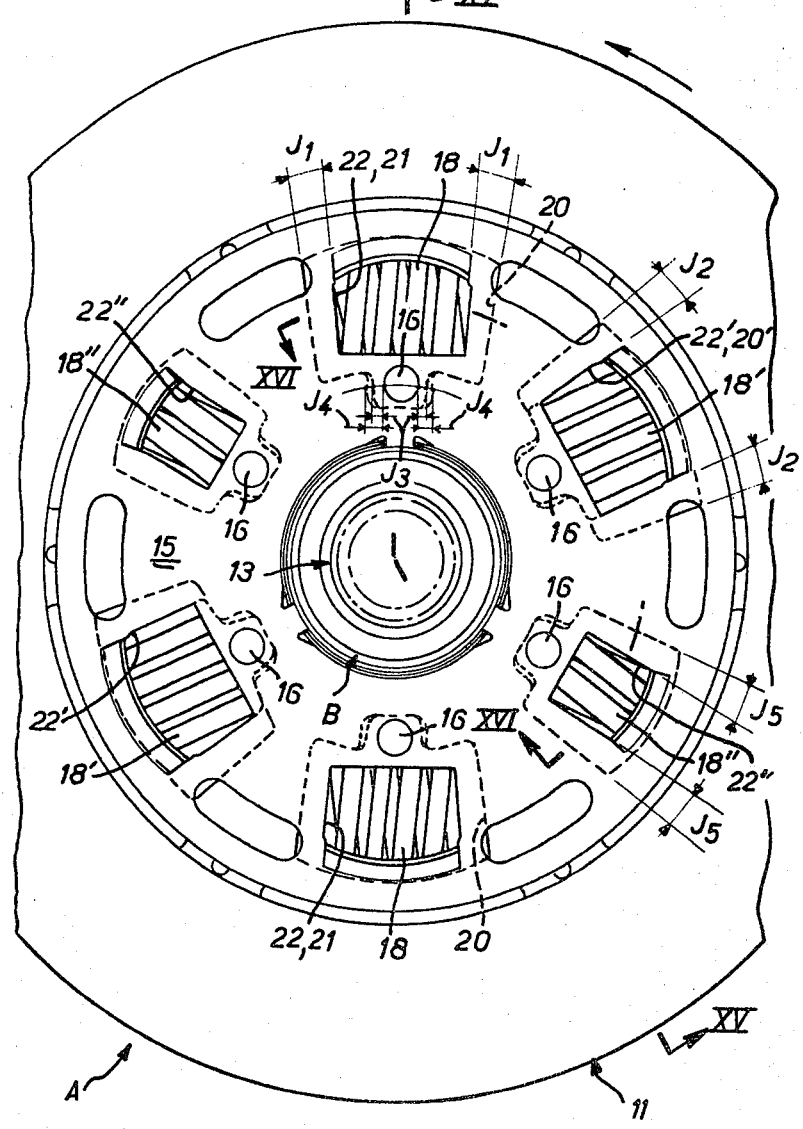
FIGS. 14 and 15 are views analagous to those of FIGS. 1 and 2, respectively, relating to a further embodiment of the invention.
Figure 15:
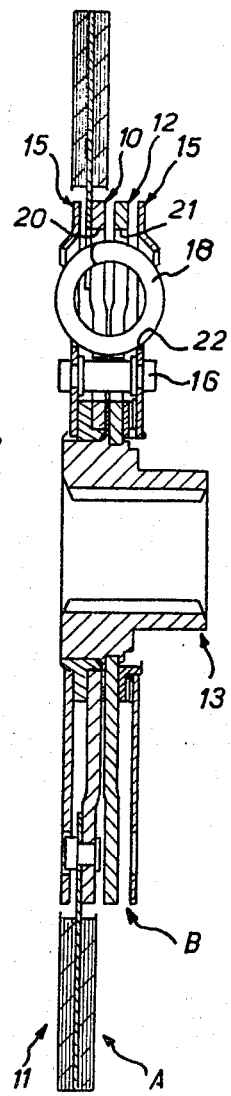

In the diagram in FIG. 13 this preliminary phase is shown by the straight line $I_0$, the slope of which is proportional to the stiffness of springs 18 only, that is to say proportional to K.

Figure 12:
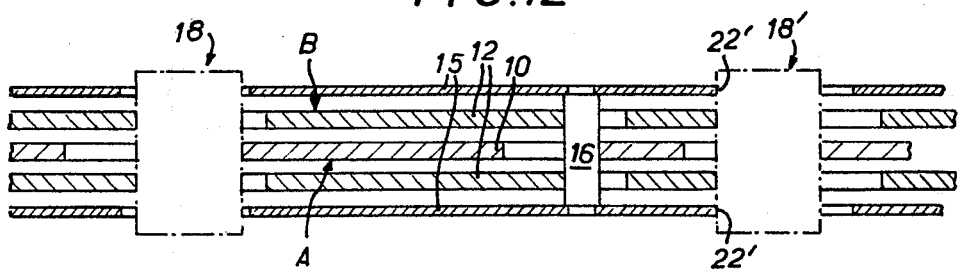

From value $D_0$ of the relative angular movement, for which springs 18 and 18' are equally compressed (FIGS. 10 and 13) operation of this embodiment is identical to that of the preceding embodiment. It is represented first by a straight line $I_1$ parallel to the aforementioned straight line I, extending to the point at which springs 18, 18' begin to cooperate in parallel (FIG. 11), followed by a change in torque at constant relative angular movement, as previously, followed by straight line $II_1$ parallel to the aforementioned straight line II extending to the point at which disk 12 is direct-driven by disks 10 (FIG. 12).

Thus it will be seen that the final torque C2 is identical to that for the previous embodiment, whereas the final value of relative angular movement D'2 is slightly less than the final value of relative angular movement D2 for the previous embodiment.

In the embodiment shown in FIGS. 14 to 19 part B incorporates only one disk 12 and there are only two groups of springs, each group including a third spring 18" in addition to springs 18, 18'.

Springs 18 and 18' are identical, as in previous embodiments. They are disposed identically as compared with previous embodiments. In the rest configuration of the damper they engage without circumferential play in windows 22, 22' in guide rings 15. Spring 18 engages without circumferential play in window 21 in disk 12 of part B and with circumferential play (of value J1 to each side) in window 20 in disk 10 of part A. Spring 18' engages without circumferential play in window 20' of disk 10 and with circumferential play (of value J2 on each side) in window 21' in disk 12 of part A.

In this embodiment, the circumferential play J2 as measured angularly exceeds circumferential play J1.

Conjointly, each spacer 16 extends through disk 10 with circumferential play (of value J4 on each side). As measured angularly, circumferential play J4 is at least equal to circumferential play J1. Each spacer 16 passes through disk 12 with circumferential play (of value J3 on each side). As measured angularly, circumferential play J3 is at least equal to circumferential play J2.

The stiffness K" of spring 18" is different to the stiffness K of springs 18, 18'.

Like springs 18, 18', in the rest configuration of the damper spring 18" engages without circumferential play in windows 22" in guide rings 15.

In this rest configuration of the damper it engages with circumferential play in both disks 10 and 12. In the embodiment shown this circumferential play is the same in respect of both disks.

As previously, in the rest configuration of the damper the circumferential play J5 is equally distributed to either side of spring 18".

In the embodiment shown, circumferential play J5 is equal to circumferential play J1.

Finally, in the embodiment shown spring 18" is pre-stressed in windows 22" in guide rings 15.

Figure 16:
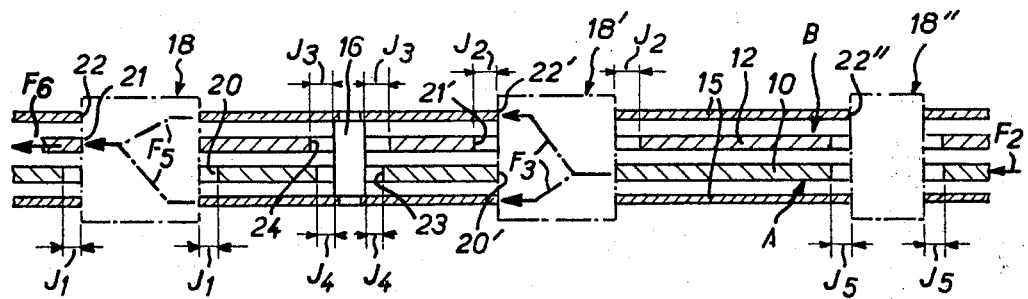
FIG. 16 is a partial circumferential cross-section, shown developed onto a flat plane, of this further embodiment, on line XVI—XVI in FIG. 14.
Figure 17:
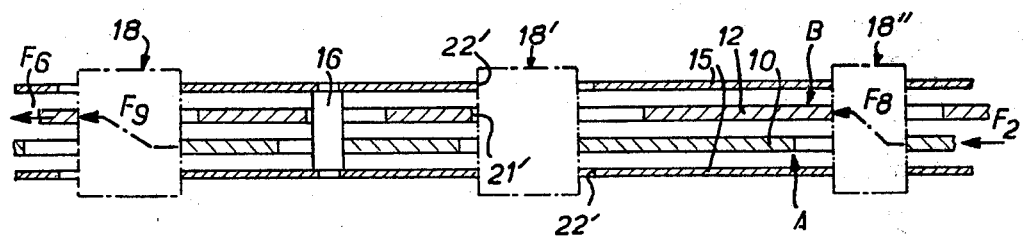
FIGS. 17 and 18 are views analagous to that of FIG. 16 and relating to two consecutive phases in the operation of this further embodiment.
Figure 18:
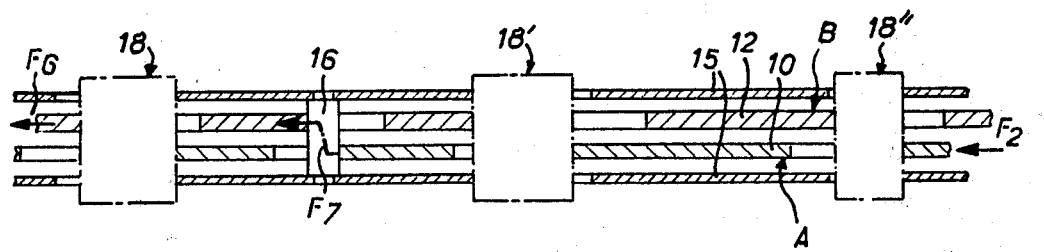

As previously, it will be assumed that disk 12 is fixed and disk 10 moves as shown by arrow F2 in FIGS. 16 to 18.

In a first phase which corresponds to a first range of relative angular movement between parts A and B of the damper, only springs 18 and 18' act, due to the circumferential play J5 around springs 18''. As previously, springs 18 and 18' cooperate in series between disk 10 and disk 12, as shown schematically by the double dashed arrows F3 and F5 in FIG. 16.

Figure 19:
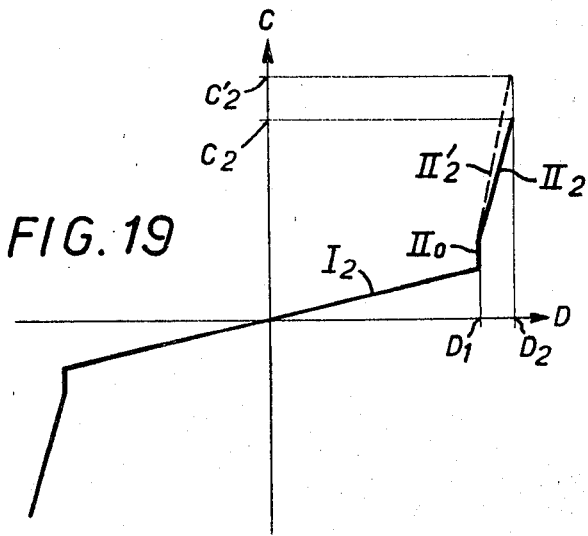
FIG. 19 is a diagram illustrating the operation of this further embodiment.

In the diagram in FIG. 19 the straight line I₂ representing this first phase of operation thus has a slope proportional to K/2, as previously.

This first phase continues until, at a value D1 of relative angular movement between parts A and B corresponding to absorption of the circumferential play J5, disk 10 acts on springs 18'' (FIG. 17).

When the pre-stressing of spring 18'' has been overcome, which corresponds to the vertical straight line II₀ in the diagram in FIG. 19, a second phase of operation begins in which springs 18– transmit directly to disk 12 the force applied to them by disk 10, as shown by the dashed arrow F8 in FIG. 17. Conjointly, springs 18 transmit directly to disk 12 the force exerted on them by disk 10, as shown by the dashed arrow F9 in FIG. 17.

Thus in this second phase of operation springs 18, 18'' cooperate in parallel while springs 18' are ineffective.

Each spring 18' can exert no action on disk 12 by virtue of the circumferential play which still exists between it and the corresponding edge of window 21' in disk 12 in which it is housed.

In the diagram in FIG. 19 the straight line II₂ representing this second phase of operation therefore has a slope proportional to $(K+K'')$.

This second phase of operation continues until, at a value D2 of relative angular movement between parts A and B representing the end of this relative angular movement, there is a direct drive engagement between parts A and B, either because, as shown in FIG. 18, disk 10 then drives disk 12 through spacers 16 (as represented schematically by the dashed arrow F7 in FIG. 18) or because certain at least of springs 18, 18', 18'' are then fully compressed with adjacent turns contiguous.

In another embodiment of the invention (not shown), the circumferential play J2 associated with springs 18' is made equal to the circumferential play J1 associated with springs 18, as in the embodiment shown in FIGS. 1 to 8.

In this case, during the second phase of operation springs 18' are also acting in parallel with the other springs and the slope of the diagram (FIG. 19) is increased, as shown at II'₂.

The final torque C'2 for the maximum value of relative angular movement between parts A and B is also increased.

In a further embodiment (also not shown) springs 18 and 18' have different rather than equal stiffnesses.

Overall, operation is the same but the slopes of the straight line sections in the corresponding diagram are modified.

Likewise, in the case of the embodiment shown in FIGS. 1 to 8, in each group of springs 18, 18' one of the springs (18 or 18') may, for example, be rendered inoperative during the second phase of operation, by making the associated circumferential play greater than that for the other spring, as described in relation to the embodiment shown in FIGS. 16 to 19 (spring 18').

In this case, and as represented schematically by the dashed line II' in the diagram in FIG. 8, the slope corresponding to this second phase of operation is correspondingly reduced.

These various embodiments illustrate the diverse range of embodiments of the invention which may be implemented to suit diverse applications.

It will be understood that various changes in the details, materials, and arrangements of parts, which have been herein described and illustrated in order to explain the nature of the invention, may be made by those skilled in the art within the principle and scope of the invention as expressed in the appended claims.

Likewise, applications of the present invention are not limited to friction clutches, instead covering all forms of torsional damper.

Neither is the present invention limited to the case in which the torsional damper comprises only two coaxial parts. Its scope also covers, for example, the case in which there are three coaxial parts with relative angular movement between the first and second absorbing, for example, noise associated with the top dead center position, and arrangements in accordance with the invention being implemented between the second and third coaxial parts.

We claim:

1. A torsional damper comprising at least first and second coaxial parts mounted to rotate relative to one another within a defined sector of relative angular movement, circumferentially disposed between said parts circumferentially acting elastic means comprising a plurality of elastic members some at least of which are associated with one another in series in a rest configuration of the damper assembly, and modulation means which, beyond a predefined degree of relative angular movement between said parts, bring about the parallel association with one another of at least some of said elastic members.

2. A torsional damper according to claim 1, wherein each of said first and second coaxial parts comprises a respective transversely disposed annular disk, the arrangement of said parts being such that said disks are parallel, and the damper further comprises at least one transversely disposed annular guide ring parallel to said disks of said parts and free to rotate relative thereto, the elastic members of said circumferentially acting elastic means being each disposed in a housing formed partly by windows in said disks of the respective coaxial parts and partly by windows in said guide ring, said elastic members being associated in groups of at least two with no circumferential play, in the rest configuration of the damper, in the corresponding windows of the guide ring, said modulation means consisting in the engagement of each elastic member in each group of elastic members, in the rest configuration of the damper, with circumferential play in the corresponding window of the disk of at least one of said coaxial parts.

3. A torsional damper according to claim 2, wherein each group of elastic members comprises two elastic members, one of which engages without circumferential play in the corresponding window in the disk of a first of said coaxial parts and with circumferential play in the corresponding window in the disk of the second of said coaxial parts, and the other of which conjointly engages with circumferential play in the corresponding window of the disk of said first coaxial part and without circumferential play in the corresponding window in the disk of said second coaxial part.

4. A torsional damper according to claim 3, wherein the circumferential play with which one of said elastic members in each group of elastic members engages in the corresponding window in the disk of a first of said coaxial parts is equal to that with which the other elastic member of said group engages in the corresponding window in the disk of the second of said coaxial parts.

5. A torsional damper according to claim 3, wherein the circumferential play with which one of said elastic members in each group of elastic members engages in the corresponding window in the disk of a first of said coaxial parts is not equal to that with which the other elastic member of said group engages in the corresponding window in the disk of the second of said coaxial parts.

6. A torsional damper according to claim 3, wherein the disk of each of said coaxial parts has windows of relatively greater circumferential extent alternating with windows of relatively lesser circumferential extent, with the windows of relatively greater circumferential extent in one disk axially aligned with those of relatively lesser circumferential extent in the other disk, and vice versa.

7. A torsional damper according to claim 3, wherein each group of elastic members includes a third elastic member which, in the rest configuration of the damper, engages with circumferential play in the corresponding window in the disk of a first of said coaxial parts and with circumferential play in the corresponding window in the disk of the second of said coaxial parts.

8. A torsional damper according to claim 7, wherein the circumferential play is the same in respect of both coaxial parts.

9. A torsional damper according to claim 2, wherein the elastic members in at least one of the groups of elastic members are all of the same stiffness.

10. A torsional damper according to claim 2, wherein the elastic members in at least one of the groups of elastic members are of different stiffness.

11. A torsional damper according to claim 2, wherein at least one of the elastic members in at least one of the groups of elastic members is pre-stressed in the rest configuration of the damper.

* * * * *